(12) United States Patent
Benderly et al.

(10) Patent No.: US 7,537,744 B2
(45) Date of Patent: May 26, 2009

(54) PROCESS FOR AMMONIA RECOVERY

(75) Inventors: Abraham Benderly, Houston, TX (US);
Keith Frederick Briegel, Houston, TX (US);
Michael Stanley DeCourcy, Houston, TX (US);
Ronald Eugene Myers, Houston, TX (US)

(73) Assignee: Rohm and Haas Company, Philadelphia, PA (US)

( * ) Notice: Subject to any disclaimer, the term of this patent is extended or adjusted under 35 U.S.C. 154(b) by 440 days.

(21) Appl. No.: 10/114,224

(22) Filed: Apr. 2, 2002

(65) Prior Publication Data

US 2002/0146363 A1 Oct. 10, 2002

Related U.S. Application Data

(60) Provisional application No. 60/282,386, filed on Apr. 6, 2001.

(51) Int. Cl.
*C01C 1/12* (2006.01)
*B01J 19/02* (2006.01)

(52) U.S. Cl. .......... 423/238; 422/240; 423/352

(58) Field of Classification Search .......... 423/238, 423/352; 422/240, 241; 95/243, 245, 251, 95/263; 96/155, 202
See application file for complete search history.

(56) References Cited

U.S. PATENT DOCUMENTS

| | | | |
|---|---|---|---|
| 2,590,146 A | 3/1952 | Barsky | |
| 2,797,148 A | 6/1957 | Carlson | |
| 3,186,795 A * | 6/1965 | Rice et al. | 423/352 |
| 3,488,293 A * | 1/1970 | Hong et al. | 252/372 |
| 3,718,731 A * | 2/1973 | Carlson et al. | 423/238 |
| 3,985,863 A * | 10/1976 | Rice et al. | 423/352 |
| 4,094,958 A * | 6/1978 | Miller | 423/238 |
| 4,172,877 A * | 10/1979 | Schwaig | 422/205 |
| 4,287,162 A * | 9/1981 | Scheibel | 423/238 |
| 4,432,958 A * | 2/1984 | Schaefer et al. | 423/356 |
| 4,567,303 A | 1/1986 | Boettger et al. | |
| 5,582,799 A * | 12/1996 | Amorese et al. | 422/118 |
| 5,648,178 A * | 7/1997 | Heyse et al. | 428/627 |
| 5,895,635 A * | 4/1999 | Brazdil et al. | 423/238 |
| 6,001,223 A | 12/1999 | Hoffman et al. | |
| 6,966,973 B2 * | 11/2005 | Nakahara et al. | 202/163 |
| 2001/0006614 A1* | 7/2001 | Nero et al. | 423/238 |
| 2002/0001555 A1* | 1/2002 | Benderly et al. | 423/238 |

FOREIGN PATENT DOCUMENTS

JP 52020387 * 2/1977 .......... 422/241

OTHER PUBLICATIONS

U.S. Appl. No. 09/847,126, filed May 2, 2001.
U.S. Appl. No. 09/847,342, filed May 3, 2001.

* cited by examiner

*Primary Examiner*—Wayne Langel
(74) *Attorney, Agent, or Firm*—Tifani M. Cottingham

(57) ABSTRACT

An improved process for ammonia recovery is provided for the recovery of substantially pure ammonia for use in industrial processes. In this improved method, specific raw materials and/or specific materials of construction are used. Overall efficiency and operational cost savings are increased as a result of the process of the present invention.

7 Claims, 1 Drawing Sheet

US 7,537,744 B2

PROCESS FOR AMMONIA RECOVERY

CROSS REFERENCE TO RELATED PATENT APPLICATION

Figure 1:
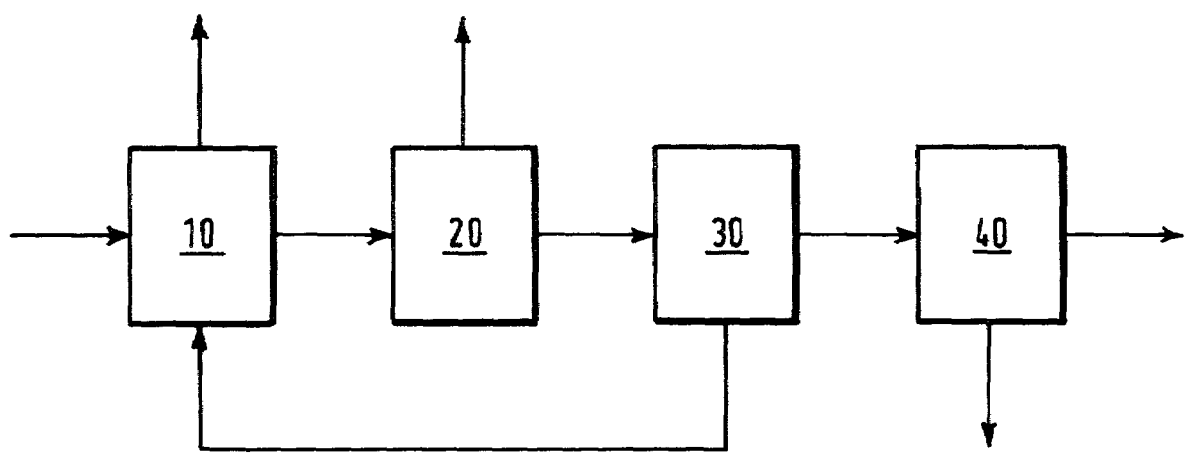

This is a non-provisional application of prior pending U.S. provisional application Ser. No. 60/282,386 filed on Apr. 6, 2001.

This invention relates to an improved process for the recovery of ammonia from industrial process streams. More particularly, this invention relates to the reduction of cyanide-based impurities in the ammonia recovery process through the use of equipment and/or operating fluids that have a low nickel content. Operating costs are reduced appreciably and efficiency is increased significantly as a result of the present invention.

In chemical manufacturing, the formation of the primary product is merely a step in a greater overall manufacturing process. Once the primary product is formed, it must then be separated from other materials, such as by-products, unreacted feed stock and catalysts. For optimum efficiency, these industrial process streams are subjected to recovery processes to isolate those materials that may be recycled to increase yield or lower manufacturing costs. These recovery processes include a myriad of quench systems, distillation systems, and settling tanks as well as various other recovery processes so that as much material as possible can be recovered. Not only are these recovered materials useful as alternate products, recycled feedstock or recovered catalysts, their recovery also reduces the total volume of waste the manufacturer must dispose of. Specifically, some industrial processes, such as the production of (meth)acrylonitrile or hydrogen cyanide and the treatment of coke oven gas, create industrial process streams containing residual ammonia. It has been recognized that the recovery and reuse of this residual ammonia is key to the economic viability of these and other industrial ammonia-producing processes.

Historically, residual ammonia was recovered from industrial process streams via sulfuric acid scrubbing. Sulfuric acid scrubbing recovers residual ammonia in the form of ammonium sulfate salts suitable for use as fertilizers. However, the advent of ammonia recovery processes capable of producing concentrated ammonia suitable for industrial use rather than fertilizer production has replaced ammonia recovery via sulfuric acid scrubbing as the industry standard. In a typical ammonia recovery process, shown in FIG. 1, a process stream containing residual ammonia, originating from any of the industrial processes described above as well as others, is quenched in an absorber 10 with a capture solution to produce an ammoniated capture solution and a process stream substantially free of ammonia. Next, the ammoniated capture solution is purified in a stripper 20 to remove any impurities that were inadvertently absorbed in the capture solution along with the ammonia, thus creating a purified ammoniated capture solution and an impurity stream. The purified ammoniated capture solution is then subjected to heat in a dissociation column 30 to free the captured ammonia from the purified ammoniated capture solution, producing a liberated stream of crude ammonia and a regenerated capture solution. The crude ammonia stream is then further concentrated in a purification column 40 to remove water and other remaining contaminants through a bottoms stream, and to yield a concentrated ammonia product stream. Various enhancements exist to minimize the concurrent absorption of impurities, such as HCN and $CO_2$, in the capture solution and to minimize impurities remaining in the purified ammoniated capture solution exiting the stripper. Nonetheless, ammonia recovery processes remain plagued by inefficiencies. One particular disadvantage of current ammonia recovery processes, for example, is that the stripper 20 is woefully inefficient, causing residual impurities to exit the stripper not in the impurity stream but rather in the purified ammoniated capture solution. Impurities remaining in the purified ammoniated capture solution then advance further into the ammonia recovery system where they negatively affect downstream processes. Impurities in the purified ammoniated capture solution lead to a reduction in overall ammonia recovery efficiency and a decrease in the purity of the final concentrated ammonia product stream. Another disadvantage of the current ammonia recovery processes is that the impurities that exit the ammonia recovery process in the concentrated ammonia product stream are then recycled into the primary production processes where they can have a severe negative impact.

Yet another disadvantage of traditional ammonia recovery processes is that some residual impurities tend to form solids, such as cyanide polymer, in the capture solution. These solids accumulate in the recycled capture solution and deposit throughout the ammonia recovery process equipment. The presence of solid impurities has a grave impact on the operability of the ammonia recovery process.

Elimination of solid impurities, once accumulated in the process equipment, is time consuming and costly. Methods such as filtration, wet oxidation, and capture solution replacement have been used to eliminate such solids. The need for such elimination negatively influences operating costs, equipment on-stream time, and the level of maintenance time and expense required to maintain the ammonia recovery unit.

Accordingly, there is a strong need to improve the efficiency of the ammonia recovery process, in particular the stripper 20. Furthermore, it would be advantageous to the manufacturer if an improvement in efficiency could be achieved at a minimal capital cost.

In the present invention, an improved process of recovering ammonia is provided wherein the nickel concentration in the ammonia recovery process streams is reduced to enable the efficient recovery of ammonia from process streams. The present invention increases impurity removal at the stripper 20 such that overall efficiency and operating costs are improved. The invention generally involves fabricating at least one ammonia recovery process component from low nickel materials of construction and/or limiting the amount of nickel in the raw materials used in the ammonia recovery process. By ammonia recovery process equipment is meant strippers, stripper ancillaries, a means for stripping impurities (such as a first heat source associated with the stripper, a heated stripping gas system associated with the stripper, or an unheated stripping gas system associated with the stripper), dissociation columns, second heat sources associated with the dissociation columns, dissociation column ancillaries and/or any portions thereof. An advantage of the present invention is in the reduction of impurities that exit the stripper 20 in the purified ammoniated capture solution. By increasing the efficiency of stripper 20, the level of impurities that remain in the concentrated ammonia product stream is greatly reduced. By reducing the level of impurities that remain in the concentrated ammonia product stream, the improved ammonia recovery process reduces the negative impact that residual impurities can have on the primary production processes.

Another advantage of the present invention is in the reduction of undesirable solids produced during ammonia recovery. The reduction of impurities remaining in the ammonia recovery equipment past the stripper 20 reduces the accumulation of undesirable solids in the process equipment. By limiting the formation of such solids, the vast costs associated with solids removal plummets.

Thus, the present invention improves the operability of the ammonia recovery process, reduces contamination of the ammonia recovery process equipment, reduces the contamination of primary process equipment exposed to the recovered ammonia, and lowers operating and maintenance costs associated with both the primary process and the ammonia recovery process.

The term "ASD" refers to at least the preliminary steps involved in an ammonia recovery process, which may include the particular steps of absorption, stripping and dissociation. ASD, however, should not be read to limit the preliminary steps to absorption, stripping, dissociation or a combination thereof.

Accordingly, in a first embodiment, the present invention provides an improved ammonia recovery system comprising:
(a) an ASD system and
(b) a purification column, operably connected to the ASD system
wherein at least a portion of the ASD system is comprised of a material of construction having less than 20% nickel by weight.

In a second embodiment, the present invention provides an improved ammonia recovery system comprising:
(a) an ASD system, containing a capture and solution
(b) a purification column, operably connected to the ASD system,
wherein a fresh capture solution is fed to the ASD system and the fresh capture solution has a nickel concentration of less than 250 ppm.

In a third embodiment, the present invention provides an improved ammonia recovery system comprising:
(a) an absorber, operably connected to
(b) a stripper, which, in turn, is operably connected to
(c) a dissociation-purification column,
wherein at least a portion of the stripper and/or at least a portion of the dissociation-purification column is comprised of a material of construction having not more than 20% nickel by weight.

In a fourth embodiment, the present invention provides an improved ammonia recovery system comprising:
(a) an absorber, operably connected to
(b) a stripper, which, in turn, is operably connected to
(c) a dissociation-purification column,
wherein the absorber contains a capture solution and wherein a fresh capture solution having a nickel concentration of less than 250 ppm is fed to the absorber.

In a fifth embodiment, the present invention provides an improved process for the recovery of ammonia from an industrial process stream comprising the steps of:
(a) providing an apparatus for the recovery of ammonia comprising:
(i) an ASD system, and
(ii) a purification column, operably connected thereto
wherein a portion of the ASD system is comprised of a material of construction having not more than 20% nickel by weight;
(b) conveying an industrial process stream containing ammonia to the apparatus; and
(c) refining the industrial process stream containing ammonia in the apparatus provided to produce a concentrated ammonia process stream.

In a sixth embodiment, the present invention provides an improved process for the recovery of ammonia from industrial process streams comprising the steps of:
(a) providing an apparatus for recovering ammonia comprising:
(i) an absorber, operably connected to
(ii) a stripper, which, in turn, is operably connected to
(iii) a dissociation-purification column,
wherein at least a portion of one or more of the absorber, the stripper, or the dissociation-purification column is comprised of a material of construction having less than 20% nickel by weight;
(b) conveying an industrial process stream comprising ammonia to the apparatus; and
(c) refining the industrial process stream comprising ammonia in the apparatus provided to produce a concentrated ammonia product stream.

In a seventh embodiment, the present invention provides an improved process for the recovery of ammonia from industrial process streams comprising the steps of:
(a) providing an apparatus containing a capture solution for recovering ammonia comprising:
(i) an absorber, operably connected to
(ii) a stripper, which, in turn, is operably connected to
(iii) a dissociation-purification column,
(b) adding a fresh capture solution having a nickel concentration of less than 250 ppm to the apparatus;
(c) conveying an industrial process stream comprising ammonia to the apparatus; and
(d) refining the industrial process stream comprising ammonia in the apparatus provided to produce a concentrated ammonia product stream.

In an eighth embodiment, the present invention provides an improved process for the recovery of ammonia from an industrial process stream comprising the steps of:
(a) providing an apparatus for the recovery of ammonia comprising:
(i) an ASD system containing a capture solution and
(ii) a purification column, operably connected thereto
(b) adding a fresh capture solution having a nickel concentration of less than about 250 ppm to the ASD system;
(c) conveying an industrial process stream containing ammonia to the apparatus; and
(d) refining the industrial process stream containing ammonia in the apparatus provided to produce a concentrated ammonia process stream.

Other and further objects, features and advantages will be apparent from the following description of presently preferred embodiments of the invention, given for the purpose of disclosure and taken in conjunction with the accompanying drawing.

FIG. 1 is a process flow diagram illustrating an ammonia recovery process which can benefit from the present invention.

This invention relates to the reduction of nickel-based impurities, such as nickel-cyano complexes, in an ammonia recovery process. By reducing these impurities through various methods discussed herein, a more efficient ammonia recovery process results.

FIG. 1 is an ammonia recovery process wherein a process stream containing residual ammonia is quenched in absorber 10 with a capture solution to produce an ammoniated capture solution and a process stream substantially free of ammonia. The capture solution may be recycled, fresh, or a combination of fresh and recycled material. Recycled capture solution is capture solution that has been used in the ammonia recovery process and regenerated to be suitable for reuse. Fresh capture solution refers to capture solution as a raw material that has not yet been used in the ammonia recovery process. Fresh capture solution can be added directly to the absorber 10 through a feed line or added to the recycle line returning regenerated capture solution to the absorber 10. Given that the ammonia recovery process system has a finite volume, it will be apparent that, if fresh capture solution is continually added to the ammonia recovery process system, it will be necessary to remove some recycled capture solution from the process system as well.

Next, the ammoniated capture solution is purified in stripper 20 to remove any impurities that were inadvertently absorbed in the capture solution along with the ammonia, thus creating a purified ammoniated capture solution and an impurity stream. Stripper 20 includes stripper ancillaries, a bottom portion, and a means for stripping impurities from the ammoniated capture solution process stream (such as a heat source, a heated stripping gas addition system, or an unheated stripping gas addition system). The term heat source includes any industrial device commonly used to supply heat to a distillation column. Examples of heat sources include but are not limited to, reboilers, live steam injection systems, and heat exchangers. Examples of heat exchangers include plate and frame heat exchangers, plate and fin heat exchangers, spiral heat exchangers, and shell and tube heat exchangers. Encompassed within the term ancillaries is all equipment that is connected to the column, including but not limited to condensers, piping, instrumentation, feed systems, bottom and overhead tower sections, column internals, vent systems, raw material addition systems, reflux systems, rundown systems and pumps.

Suitable stripping gases for use in stripper 20 include, but are not limited to, nitrogen, natural gas, propane, propylene, compressed air, hydrogen, steam, acrylonitrile process absorber off-gas, oxygen, acetone, and argon. Mixtures of one or more of these gases may also be utilized.

The term stripping gas addition system as used herein refers to any means known in the art for delivering stripping gas to stripper 20, such that the stripping gas comes into intimate contact with the ammoniated capture solution. Stripping gas addition systems may comprise, for example, piping, nozzles, injectors, spargers, baffles, trays, packing, or distributors.

Stripping gases may be introduced to the stripper 20 either heated using known methods such as heat exchangers, or unheated. Stripping may be accomplished through a mixture of heated and unheated stripping gases, multiple stripping gas addition systems or the use of a heat source in combination with stripping gas addition system. In the next step, the purified ammoniated capture solution is subjected to heat in a dissociation column 30 to free the captured ammonia from the purified ammoniated capture solution. The dissociation column 30 produces a stream of regenerated capture solution (that may be recycled to the absorber 10) and a liberated stream of crude ammonia. The dissociation column has a heat source, dissociation column ancillaries, and a bottom portion located at the end of the dissociation column closest to the heat source. By dissociation column ancillaries is meant all equipment that is connected to the column, including but not limited to condensers, piping, instrumentation, feed systems, bottom and overhead tower sections, vent systems, raw material addition systems, reflux systems, rundown systems and pumps.

In the last step, the crude ammonia stream is then further concentrated in a purification column 40 to remove water and other remaining contaminates through a bottoms stream and to yield a concentrated ammonia product stream.

The term "ASD" refers to at least the preliminary steps involved in an ammonia recovery process, which may include the particular steps of absorption, stripping and dissociation. ASD, however, should not be read to limit the preliminary steps to absorption, stripping, dissociation or a combination thereof.

It is contemplated that the dissociation 30 and purification 40 steps of the present invention may be performed in a single column. For instance, a single distillation column may be used to dissociate the ammonia from the capture solution and remove impurities from the ammonia and the capture solution. Such a column could be referred to as a dissociation-purification column.

Surprisingly, we have discovered that the concentration of metal ions, particularly nickel ions, in the ammonia recovery process, has a strong effect on impurity removal efficiency in the stripper 20 due to the fact that nickel ions combine with cyanide ions and form nickel-cyano complexes. Moreover, we have determined that by limiting the concentration of nickel present in the ammonia recovery process, formation of nickel-cyano complexes in the capture solution can be minimized and thereby impurity removal efficiency can be vastly improved. We have further discovered that, by utilizing low nickel content materials of construction for ammonia recovery process equipment and/or by controlling the concentration of nickel in the capture solution prior to its addition to the ammonia recovery process, the concentration of nickel ions, and thus nickel-cyano complexes, may be minimized. That minimization provides enhanced impurity-removal efficiency of the stripper 20.

There are three ways in which undesirable metal ions may enter the ammonia recovery process. First, they may enter through the corrosion of the process equipment used. Secondly, these problematic ions may enter through the composition of the capture solution (used to quench the ammonia-containing process stream), which itself can be affected by several variables. The third source is the ammonia-containing process stream itself. The present invention address the first two problems. Interestingly, we have found that metal ions may enter the process via corrosion of the ammonia recovery process equipment itself. We have found that through the use of particular materials of construction as shown in the discussion below, this problem can be virtually eliminated.

The composition of the capture solution can also affect the efficiency of the ammonia recovery process. Capture solutions (referred to above) are acid-based solutions formed from compounds such as phosphoric acid, nitric acid, oxalic acid, boric acid, ammonium hydrogen phosphate solutions, or mixtures thereof. Metal ions may be present in these compounds and may therefore be introduced into the process when these compounds are used to form the capture solution. Further, metal ions may enter the capture solution through the normal corrosion of equipment used to process, store, handle or transport the capture solution prior to its addition to the ammonia recovery process. Still further, metal ions may enter the capture solution at the point of its introduction to the ammonia recovery process itself through the corrosion of equipment used to introduce the capture solution to the process. The metal ions from these various sources, as well as others, enter the ammonia recovery process in the capture solution.

Formation of nickel-cyano complexes is dependent on the concentration of both cyanide ions and nickel ions in the ammonia capture solution. By reducing or eliminating the presence of either cyanide or nickel ions, the level of cyano complex impurities can be proportionally reduced or eliminated. Consequently, the formation of cyanide-based solids can be reduced.

The concentration of nickel present in the ammonia recovery process may be controlled by selecting materials of construction for the ammonia recovery process equipment sufficiently low in nickel content. The concentration of nickel in the ammonia recovery process may also be controlled by limiting the concentration of nickel present in the capture solution prior to its introduction to the ammonia recovery process. Similarly, the concentration of nickel in the ammonia recovery process may be controlled by utilizing both a low nickel capture solution and low nickel content materials of construction for the ammonia recovery process equipment. To control nickel-cyano impurities in the ammonia recovery process via control of nickel concentration in the capture solution, the concentration of nickel in the capture solution, as measured at its point of introduction into the ammonia recovery process, should be less than 250 ppm nickel ions. To control nickel-cyano impurities in the ammonia recovery process via the selection of materials of construction for the ammonia recovery process equipment sufficiently low in nickel content, the materials chosen should exhibit less than 20% nickel by weight. Controlling nickel concentration provides lower operating costs, improved ammonia recovery process operability, higher recovered ammonia purity, and reduced contamination of downstream processes.

The cyanide ion components of the nickel-cyano impurities are introduced to the ammonia recovery process along with the process stream containing residual ammonia and are a normal component of the process stream containing residual ammonia. It will be apparent to one skilled in the art that minimizing the amount of cyanide ions introduced to the ammonia recovery system will further enhance the utilization of the method of the present invention.

Specifically, we have found that nickel ions in particular form, inter alia, complexes with cyanide ions via the following reactions:

$$Ni^{+2} + 2CN^- \Leftrightarrow Ni(CN)_2$$

$$Ni(CN)_2 + 2CN^- \Leftrightarrow Ni(CN)_4^{-2}$$

$$Ni(CN)_4 + CN^- \Leftrightarrow Ni(CN)_5^{-3}$$

Some of these nickel-cyano complexes are especially stable, particularly the tetra- and penta-cyano complexes. The physical conditions (temperature, pressure, pH, etc.) present in the stripper 20 are generally not sufficient to dismantle and remove these tetra- and penta-cyano complexes. Thus, they pass through the stripper in the purified ammoniated capture solution, where they are passed on to the dissociation column 30 and subjected to more extreme physical conditions. The higher temperatures and more acidic conditions present in the dissociation column 30 cause the tetra-cyano and penta-cyano complexes to break, liberating cyanide ions. These cyanide ions then form undesirable solids that accumulate in the ammonia recovery process piping and equipment and contaminate the ammonia recovery processes equipment.

Ammonia recovery process equipment includes absorbers, strippers (especially the bottom sections of the strippers), heat sources, stripping gas injection systems (heated and unheated), stripper ancillaries, dissociation columns (especially the bottom sections of the dissociation columns), dissociation columns ancillaries, and purification columns.

Materials that have a "low nickel content" are those with less than 20% nickel content by weight. Materials with nickel content greater than this are herein referred to as high-nickel content materials of construction. Examples of high nickel content materials of construction include 6-moly stainless steels, alloy 20, hastelloy B2, hastelloy C276, and Inconel 625. Low nickel content materials of construction that fall within the scope of the present invention include, but are not limited to, 300 series stainless steels, 400 series stainless steels, Duplex stainless steels, tantalum, and zirconium. Duplex 2205, 410, and 430 stainless steels are especially preferred due to their excellent corrosion resistance. It will be apparent to one of ordinary skill in the art that non-metallic materials of construction (such as resins or ceramics) are similarly suitable for use in the method of the present invention.

Further, in some embodiments, the manufacturer may reduce capital costs by utilizing less expensive base metals, such as carbon steel, overlaid with the higher cost low nickel content material. Such low nickel content overlays may include glass, epoxy, elastomer, fluoropolymer, or any one of the above-listed low nickel content metals. In such instances, the overlay is placed over, and may be optionally bonded to, the base metal. The goal of such low nickel content overlays is to prevent base-metal contact with the ammonia recovery process streams while also preventing the release of nickel ions into the ammonia recovery process.

The present invention, therefore, is well adapted to carry out the objects and attain both the ends and the advantages mentioned, as well as other benefits inherent therein. While the present invention has been depicted, described, and is defined by reference to particular embodiments of the invention, such references do not imply a limitation to the invention, and no such limitation is to be inferred. The invention is capable of considerable modification in form and/or function, as will occur to those of ordinary skill in the pertinent arts. The depicted and described embodiments of the invention are exemplary only, and are not exhaustive of the scope of the present invention. Consequently, the present invention is intended to be limited only by the spirit and scope of the appended claims, giving full cognizance to equivalents in all respects.

COMPARATIVE EXAMPLE 1

A reboiler with Hastelloy C276 tubes was used as the heating apparatus for the dissociation column in an ammonium phosphate-based ammonia recovery process. Fresh ammonium phosphate solution was charged to the ammonia recovery process and the dissociation column reboiler was operated at a constant target temperature of 140° C. After one month of operation, the nickel concentration of the purified ammoniated capture solution (as measured in the feed to the dissociation column) was approximately 250 ppm, the free cyanide ion concentration in the feed to the dissociation column was 268 ppm, and the complexed cyanide concentration was estimated to be 1100 ppm. HCN removal from the ammoniated capture solution exiting the stripper was less than 85% and significant contamination of the concentrated ammonia product stream was observed.

EXAMPLE 1

A reboiler with 300 series stainless steel tubes was used as the heating apparatus for the dissociation column in an ammonium phosphate-based ammonia recovery process. Fresh ammonium phosphate solution was charged to the ammonia recovery process and the dissociation column reboiler was operated at a constant target temperature of 140° C. After one month of operation, the nickel ion concentration of the purified ammoniated capture solution (as measured in the feed to the dissociation column) was approximately 20 ppm, the free cyanide ion concentration in the feed to the dissociation column was 0 to 10 ppm, and the complexed cyanide concentration was estimated to be 80 ppm. HCN removal from the ammoniated capture solution exiting the stripper was greater than 98% and resulting concentrated ammonia product stream purity was high.

What is claimed is:

1. An ammonia recovery process, the process comprising the steps of:
   a) providing an ammonia containing process stream;
   b) providing a capture solution comprising one or more selected from the group consisting of:
   phosphoric acid, nitric acid, oxalic acid, boric acid, and ammonium hydrogen phosphate;
   c) quenching the ammonia containing process stream to form an ammoniated capture solution;
   d) purifying the ammoniated capture solution to form a purified ammoniated capture solution;
   e) freeing ammonia from the purified ammoniated capture solution to form a concentrated ammonia product stream;
   wherein the concentration of Nickel ions in the capture solution is maintained at a concentration of less than 250 ppm.

2. The process of claim 1 wherein the ammonia containing process stream further comprises hydrogen cyanide.

3. The process of claim 1 wherein the ammoniated capture solution comprises cyanide ions.

4. The process of claim 1 wherein the concentration of nickel in the capture solution, as measured at its point of introduction into the ammonia recovery process, is less than 250 ppm nickel ions.

5. The process of claim 1 wherein the freeing is performed in a dissociation column.

6. An ammonia recovery process, the process comprising the steps of:
   a) providing an ammonia containing process stream;
   b) providing a capture solution comprising one or more selected from the group consisting of: phosphoric acid, nitric acid, oxalic acid, boric acid, and ammonium hydrogen phosphate;
   c) quenching the ammonia containing process stream to form an ammoniated capture solution;
   d) purifying the ammoniated capture solution to form a purified ammoniated capture solution;
   e) freeing ammonia from the purified ammoniated capture solution to form a concentrated ammonia product stream;
   wherein the concentration of Nickel ions in the capture solution is maintained at a concentration of less than 250 ppm wherein the freeing is performed in a dissociation column and further wherein the dissociation column comprises materials of construction having less than 20% Nickel by weight.

7. An ammonia recovery process, the process comprising the steps of:
   a) providing an ammonia containing process stream;
   b) providing a capture solution comprising one or more selected from the group consisting of: phosphoric acid, nitric acid, oxalic acid, boric acid, and ammonium hydrogen phosphate;
   c) quenching the ammonia containing process stream to form an ammoniated capture solution;
   d) purifying the ammoniated capture solution to form a purified ammoniated capture solution;
   e) freeing ammonia from the purified ammoniated capture solution to form a concentrated ammonia product stream;
   wherein the concentration of Nickel ions in the capture solution is maintained at a concentration of less than 250 ppm; and wherein the freeing is performed in a dissociation column and further wherein the dissociation column comprises one or more low-nickel content materials selected from the group consisting of: glass, epoxy, elastomer, fluoropolymer, 300 series stainless steels, 400 series steels, duplex stainless steels, tantalum, and zirconium.

* * * * *